United States Patent
Zhu (10) Patent No.: US 11,588,957 B2
(45) Date of Patent: Feb. 21, 2023

(54) DIRTY MONOCULAR CAMERA DETECTION METHODS FOR AUTONOMOUS DRIVING VEHICLE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 260 days.

(21) Appl. No.: 16/910,491

(22) Filed: Jun. 24, 2020

(65) Prior Publication Data
US 2021/0409578 A1    Dec. 30, 2021

(51) Int. Cl.
*G06T 1/20* (2006.01)
*H04N 5/217* (2011.01)
*G06T 1/60* (2006.01)
*B60S 1/56* (2006.01)

(52) U.S. Cl.
CPC .............. *H04N 5/2171* (2013.01); *B60S 1/56* (2013.01); *G06T 1/20* (2013.01); *G06T 1/60* (2013.01)

(58) Field of Classification Search
CPC ........... H04N 5/2171; G06T 1/20; G06T 1/60; G06T 2207/30168; G06T 2207/30252; B60S 1/56
See application file for complete search history.

(56) References Cited

U.S. PATENT DOCUMENTS

| 2015/0203076 A1* | 7/2015 | Irie ........................ G06T 7/174 15/319 |
| 2016/0004144 A1* | 1/2016 | Laroia .................. H04N 5/2171 348/222.1 |

* cited by examiner

*Primary Examiner* — Hau H Nguyen
(74) *Attorney, Agent, or Firm* — Womble Bond Dickinson (US) LLP (57) ABSTRACT

Systems and methods are disclosed for identifying a dirty camera in a monocular camera comprising n cameras. For each of one or more cycles, a dirty counter variable for each of the n cameras is set to 0. For each of the n cameras, an image is captured from the camera and an image metric is determined for the image, e.g. brightness and/or contrast. If the image metric is 10% greater, or 10% less, than the image metric for any of the other n−1 cameras in the monocular camera, then that camera is determined to be dirty and a corrective action is taken, such as sending an alarm to an occupant the vehicle or initiating a cleaning operation. If the dirty condition persists for a camera that has been cleaned within a threshold period of time (i.e., recently), then an alarm is sent to an operator of the vehicle.

20 Claims, 8 Drawing Sheets

DIRTY MONOCULAR CAMERA DETECTION METHODS FOR AUTONOMOUS DRIVING VEHICLE

TECHNICAL FIELD

Embodiments of the present disclosure relate generally to operating autonomous driving vehicles. More particularly, embodiments of the disclosure relate to detecting a dirty camera sensor in an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Motion planning depends greatly upon reliable detection obstacles in the environment surrounding a vehicle in autonomous driving mode. In autonomous driving mode, accurate detection of obstacles depends upon the reliability and accuracy of sensors employed by the vehicle. Such sensors are subjected to driving environments that include dust, dirt, tailpipe exhaust, smog, rain, mud, snow, and other contaminants that may reduce reliability of the sensors. Images obtained from camera sensors, for example, can become blurry or obscured from road conditions, reducing the accuracy of images obtained from such cameras. In bright light conditions, a dirty camera can produce images with too much brightness due to light refracted off the dirt on the lens of the camera. In dim, or dark, light, a dirty camera can produces images with too little brightness since what little light there is may be blocked from the camera sensor.

There are existing detection methods for a stereo camera, based upon the cameras being designed to see very similar images. With a stereo camera, one could compare images from each camera to determine whether there is a significant difference in brightness and/or contrast between images of each camera in the stereo camera. In a monocular camera, having e.g. four cameras each with a different focal length, images of the four cameras cannot be directly compared to determine whether a particular camera in the monocular camera is dirty for at least the reason that each camera in the monocular camera has a different focal length from the other cameras in the monocular camera.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments a method for identifying a dirty camera in a monocular camera comprising n cameras includes, for each of one or more cycles, setting a dirty_count variable to 0, for each of the n cameras. In an embodiment, there are four (4) cameras. In an embodiment, for each camera, $C_1 \epsilon C_1 \ldots C_{n-1}$, a focal length, F, satisfies the relation $F(C_i) > F(C_{i+1})$, for $i=1 \ldots n-1$. For each of the n cameras, an image is captured from the camera and an image metric is determined for the image, e.g. brightness or contrast. If the image metric is a certain percentage such as 10% greater, or 10% less, than the image metric for any of the other n-1 cameras during one or more cycles, then that camera is determined to be dirty and a corrective action is taken, such as sending an alarm to an occupant the vehicle or initiating a cleaning operation. If the dirty condition persists for a camera that has been cleaned, and the dirty condition lasts for longer than a threshold period of time (i.e., lasts for longer than 1 to 3 minutes), then an alarm is sent to an operator of the vehicle. That is, a difference of an optical attribute (e.g., brightness, contrast) between a particular camera and any other cameras is greater than a predetermined difference threshold, that particular camera may be considered dirty.

Figure 1:
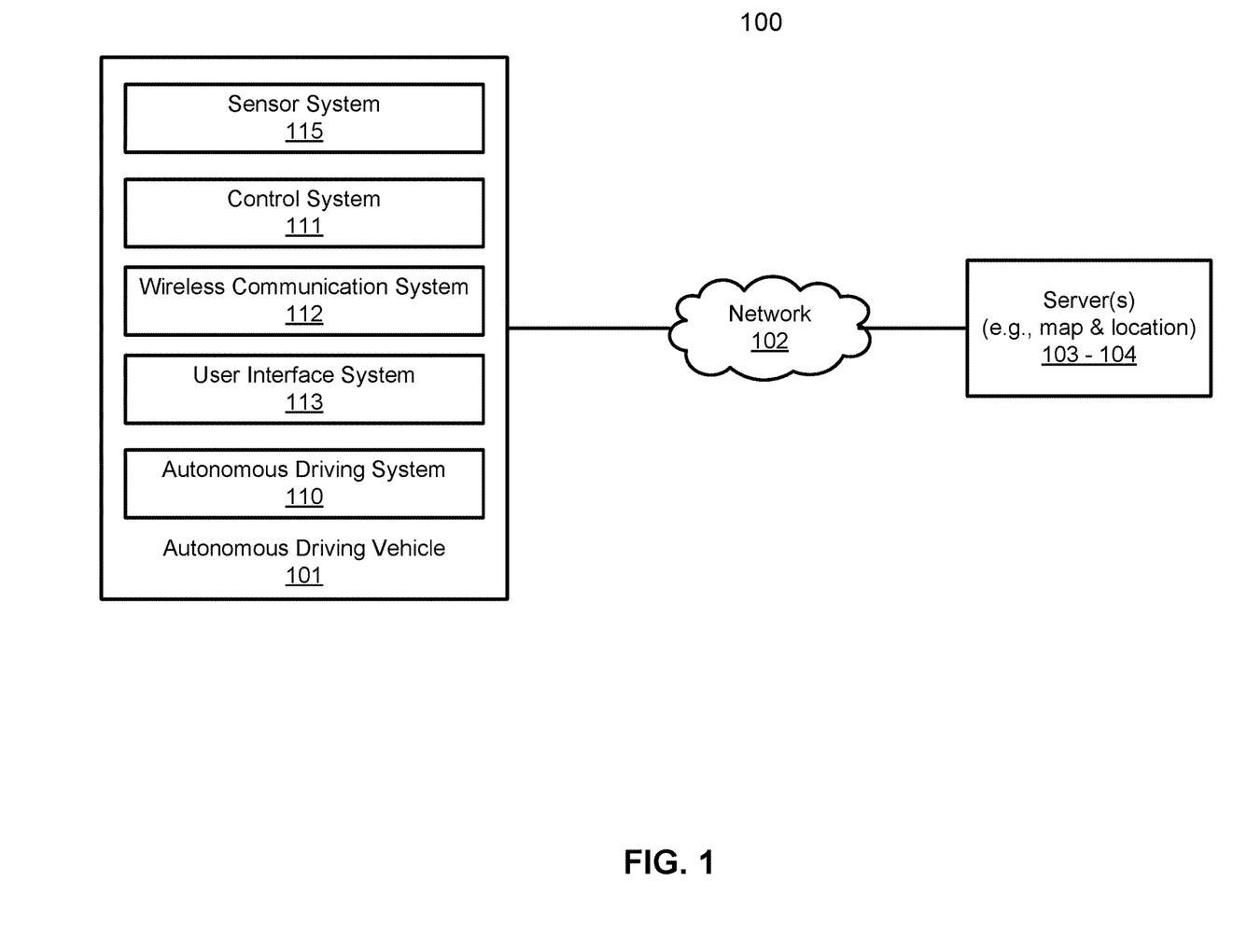
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
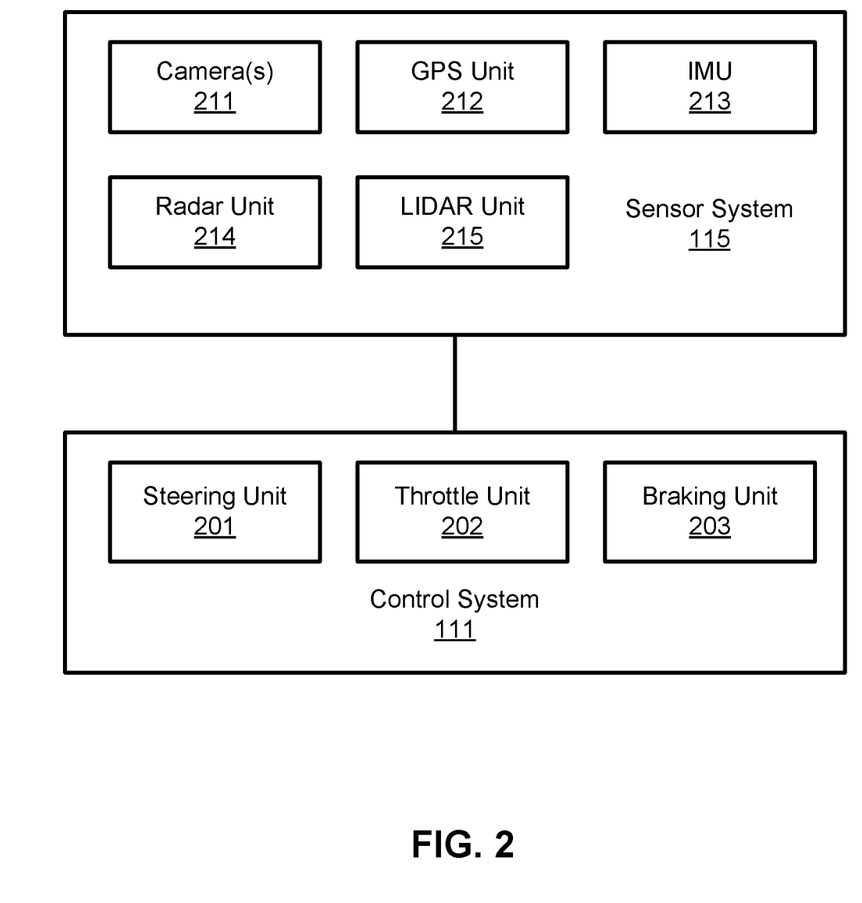
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components.

Cameras 211 may include one or more devices to capture images of the environment surrounding the ADV. Cameras 211 may be still cameras and/or video cameras. A camera may be mechanically movable, for example, by mounting the camera on a rotating and/or tilting a platform. Camera 211 can be a monocular camera comprising a plurality of n cameras having a same or similar direction with differing focal lengths such that a first image from a first camera with a first focal length is substantially contained within a second image from a second camera having a second focal length that is longer than the first focal length. The plurality of cameras $C_1 \ldots C_n$ that make up the monocular camera each have a focal length F such that $F(C_1) > F(C_2) \ldots > F(C_{n-1}) > F(C_n)$.

Cameras $C_1 \ldots C_n$ can each have a frame capture rate, such as 20 Hz, 50 Hz, etc. At a periodic cycle rate, such as 10 Hz, a most-recent image captured by each camera can be stored, creating a sample image set $I_1 \ldots I_n$ of images corresponding to cameras $C_1 \ldots C_n$ for the cycle. A image metric, M, such as brightness or contrast, can be computed for each image in the same image set, generating a set of metrics $M_1 \ldots M_n$ corresponding to cameras $C_1 \ldots C_n$. When cameras $C_1 \ldots C_n$ are properly maintained (e.g. periodically cleaned) the sample set of images will have the property $M_1 > M_2 > \ldots M_{n-1} > M_n$ or $M_1 < M_2 < \ldots M_{n-1} < M_n$. The relational symbols ">" and "<" are not absolute. In the preceding relationships, $M_i > M_{i+1}$ is consider to be true, if $M_i$ is not smaller than 90% of $M_{i+1}$. Similarly, $M_i < M_{i+1}$ is considered to be true, if $M_i$ is not larger than 110% of $M_{i+1}$. This provides a significant buffer to reduce false positives. The aforementioned properties can be used to determine whether one or more cameras that make up the monocular camera are dirty.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
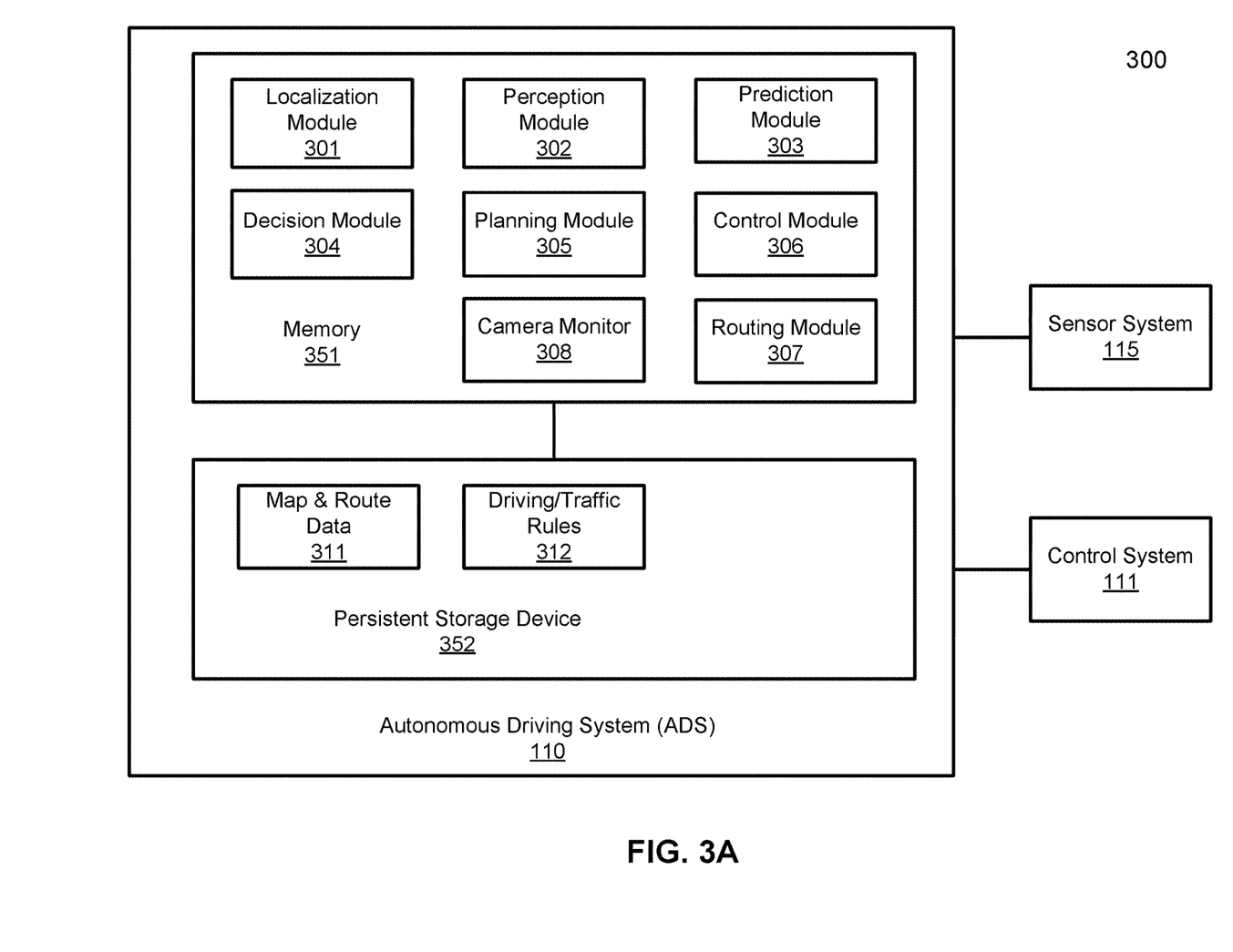
FIGS. 3A and 3B are block diagrams illustrating an example of an autonomous driving system used with an autonomous driving vehicle according to one embodiment.
Figure 3B:
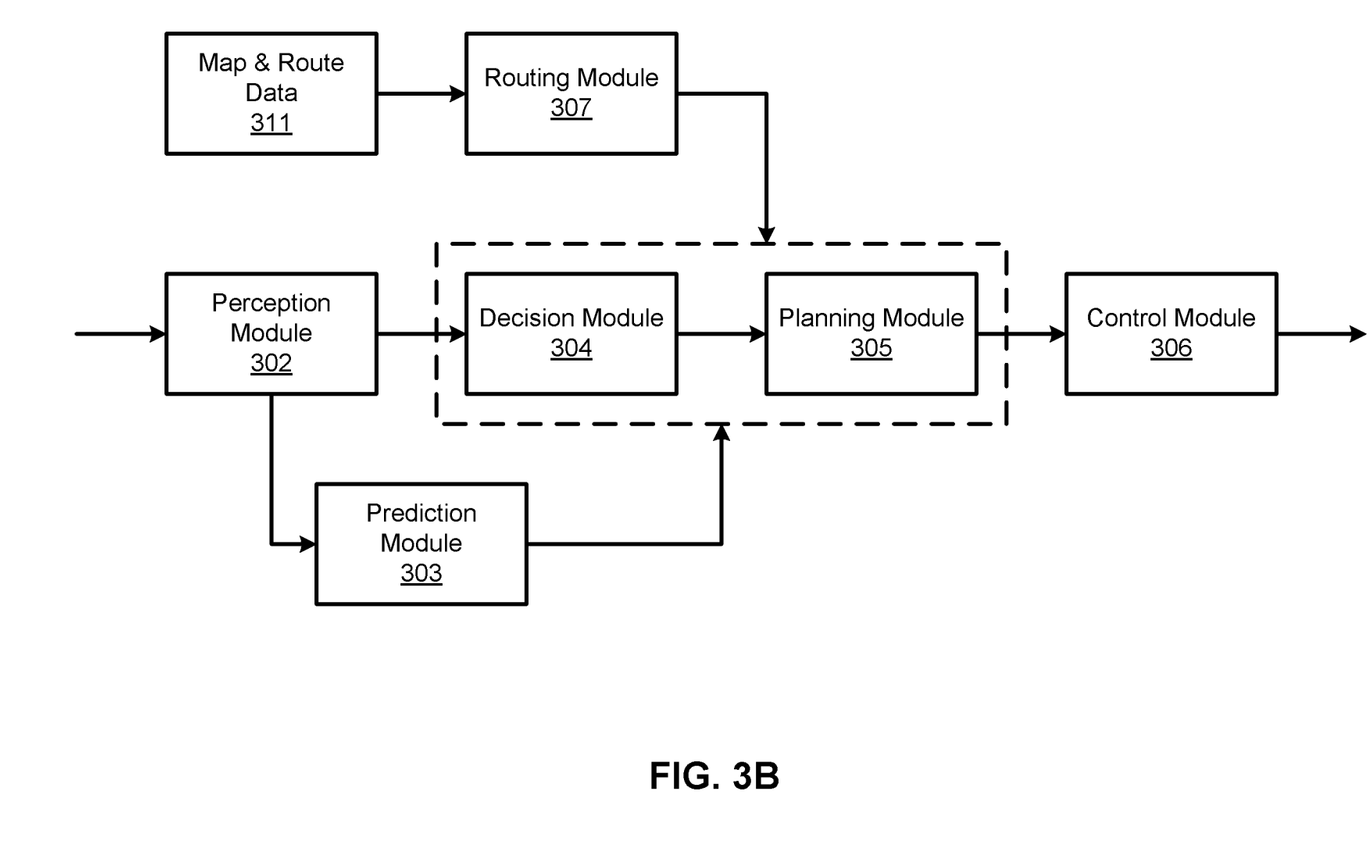

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and camera monitor module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, camera monitor module 308 may be implemented as a part of perception module 302.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

Perception module 302 can incorporate camera monitor module 308 that determines whether the camera, e.g. camera 211, is becoming dirty such that the camera may need to be cleaned. In an embodiment, camera monitor 308 can be a separate module. As described above, with reference to FIG. 2, camera 211 can be a monocular camera comprising a plurality of n cameras having a same direction, with differing focal lengths, such that a first image from a first camera with a first focal length is substantially contained within a second image from a second camera having a second focal length that is longer than the first focal length. The plurality of cameras $C_1 \ldots C_n$ that make up the monocular camera each have a focal length F such that $F(C_1) > F(C_2) \ldots > F(C_{n-1}) > F(C_n)$.

Cameras $C_1 \ldots C_n$ can each have a frame capture rate, such as 20 Hz, 50 Hz, etc. At a periodic cycle rate, such as 10 Hz, a most-recent image taken by each camera can be stored, creating a sample image set $I_1 \ldots I_n$ of images corresponding to cameras $C_1 \ldots C_n$ for the cycle. A image metric, M, such as brightness or contrast, can be computed for each image in the same image set, generating a set of sample image metrics $M_1 \ldots M_n$ corresponding to sample image set cameras $C_1 \ldots C_n$. When cameras $C_1 \ldots C_n$ are properly maintained (e.g. periodically cleaned as may be needed) the sample set of images $I_1 \ldots I_n$ will have the property $M_1 > M_2 > \ldots M_{n-1} > M_n$ or $M_1 < M_2 < \ldots M_{n-1} < M_n$. The relational symbols ">" and "<" are not absolute. In the preceding relationships, $M_i > M_{i+1}$ is consider to be true, if $M_i$ is not smaller than 90% of $M_{i+1}$. Similarly, $M_i < M_{i+1}$ is considered to be true, if $M_i$ is not larger than 110% of $M_{i+1}$. This provides a significant buffer to reduce false positives. If one or more cameras that make up the monocular camera do not meet the aforementioned properties, then one or more cameras that make up the monocular camera are dirty. Methods for determining whether one or more cameras that make up the monocular camera are dirty are described below with reference to FIGS. 6A and 6B.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
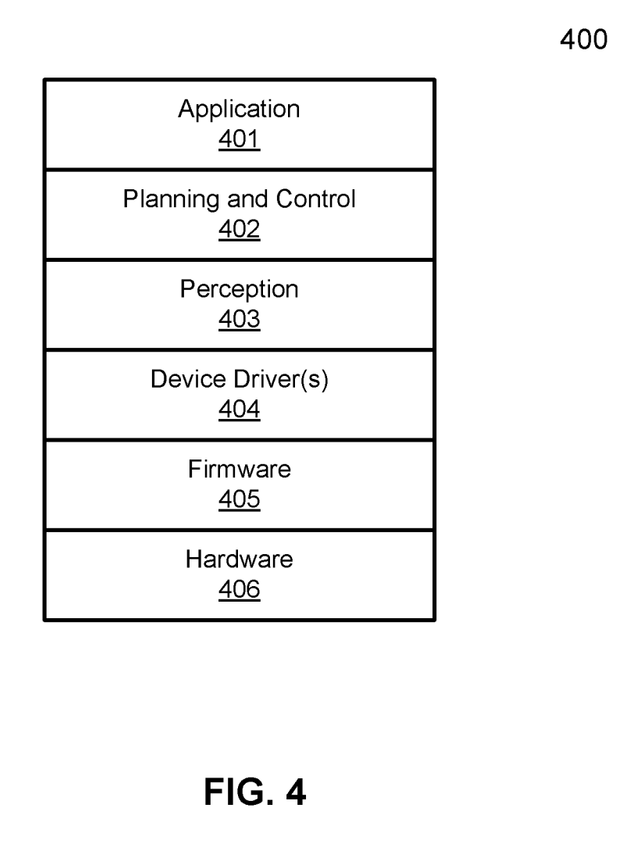
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
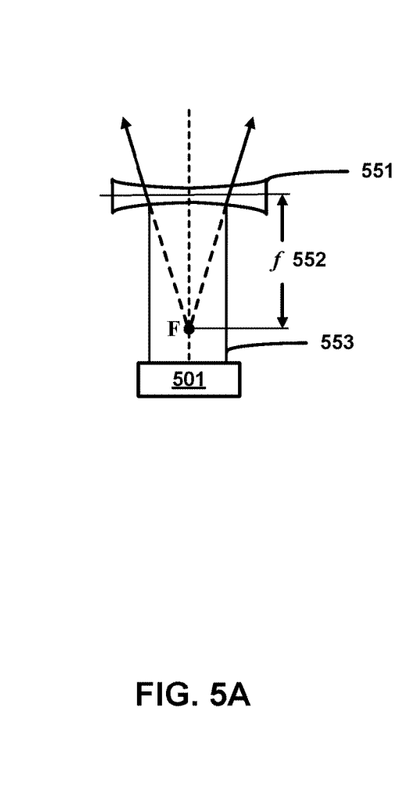
FIG. 5A illustrates an example configuration of a single camera, e.g. camera 501, within a multi-camera monocular sensor system with differing focal lengths for each camera in an autonomous driving vehicle, according to one embodiment.

FIG. 5A illustrates an example configuration of a single camera, e.g. camera 501, within a multi-camera monocular sensor system with differing focal lengths for each camera, for use in an autonomous driving vehicle, according to one embodiment.

Figure 5B:
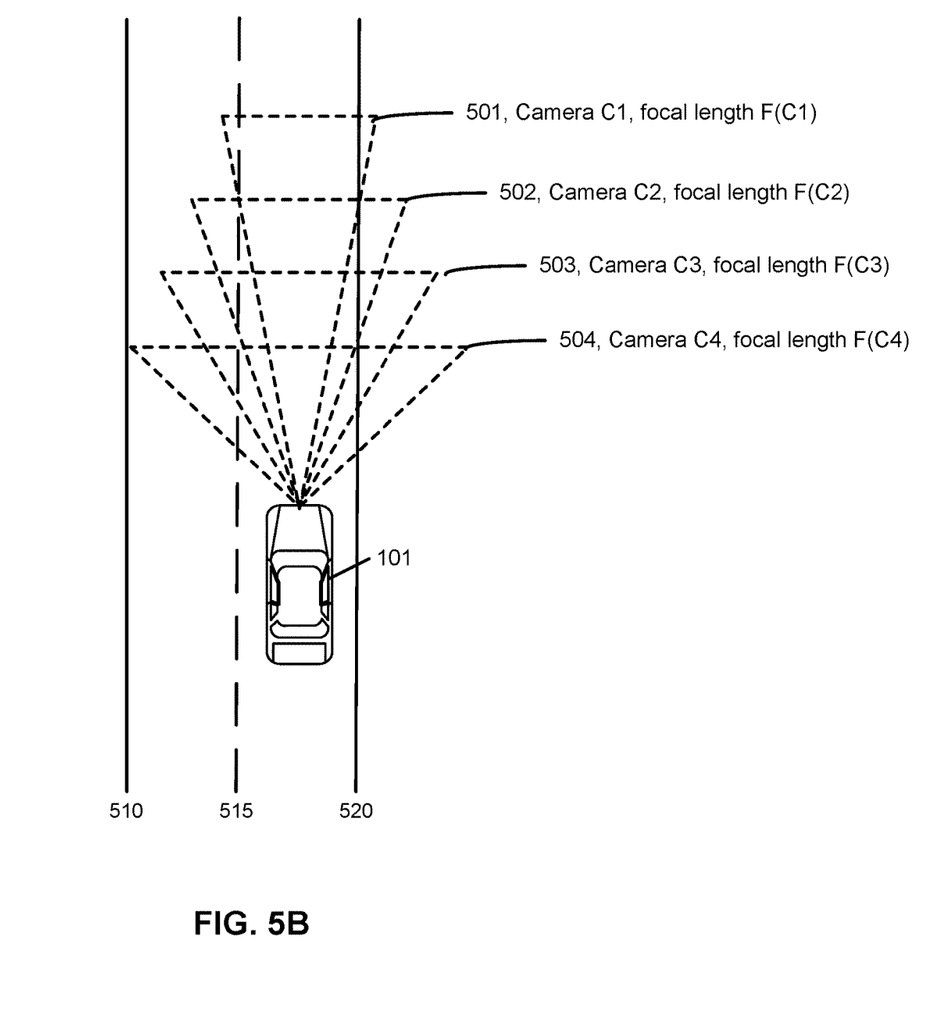
FIG. 5B illustrates an autonomous driving vehicle (ADV) 101 on a multi-lane roadway.

A camera 501 can have a lens, e.g. concave lens 551 positioned such that light from a distance away from the camera 501 and lens 551 presents a collimated image 553 to camera 501. A focal length f 552 of the optical system is a measure of how strongly the optical system converges or diverges light. A system with a shorter focal length bends light rays more sharply, resulting in a wider field of view at a nearer distance than a longer focal length which bends light less sharply and results in a narrower field of view at a farther distance. Camera 211 of the ADV can comprise a monocular camera having a plurality, e.g. 4, cameras each having a different focal length. Each camera can also have a different image capture rate than the other cameras. In an embodiment, all cameras that make up the monocular camera have a same capture rate, e.g. 20 Hz or 50 Hz. A relationship of focal length to field of view is shown in FIG. 5B, described below. Field of view, taking focal length into account, may vary based upon variances in the curvature of lens 551. Thus, the position of camera, e.g. 501, with respect to lens 551 may be adjustable at manufacturing or service time, to set a specific field of view for a camera of the monocular camera.

FIG. 5B illustrates an autonomous driving vehicle (ADV) 101 on a multi-lane roadway. The ADV 101 is driving in a lane bounded on the left by lane indicator 515 and bounded on the right by lane boundary 520. Lane boundary 520 can be a curb, a shoulder of the multi-lane roadway, a paint stripe, or other lane boundary. Another lane of the multi-lane roadway is bounded on the left by lane boundary 510 and on the right by lane boundary 515. Lane boundary 510, like lane boundary 520, can be a curb, a shoulder of the multi-lane roadway, a paint stripe, or other lane boundary.

ADV 101 includes a monocular camera comprising a plurality of cameras, e.g. $C_1$ through $C_4$. Each camera has a capture rate, a focal length, and a resulting field of view. In the example of FIG. 5B, camera $C_1$ has field of view 501 and focal length $F(C_1)$, camera $C_2$ has field of view 502 and focal length $F(C_2)$, camera $C_3$ has field of view 503 and focal length $F(C_3)$, and camera $C_4$ has field of view 504 and focal length $F(C_4)$. Focal lengths $F(C_1)>F(C_2)>F(C_3)>F(C_4)$. A sample set of images, $I_1 \ldots I_4$, is generated by capturing a most recent image from each camera. The sample set of images can be used to determine whether any of the cameras that make up the monocular camera need to be cleaned, as described below with reference to FIGS. 6A and 6B.

Figure 6A:
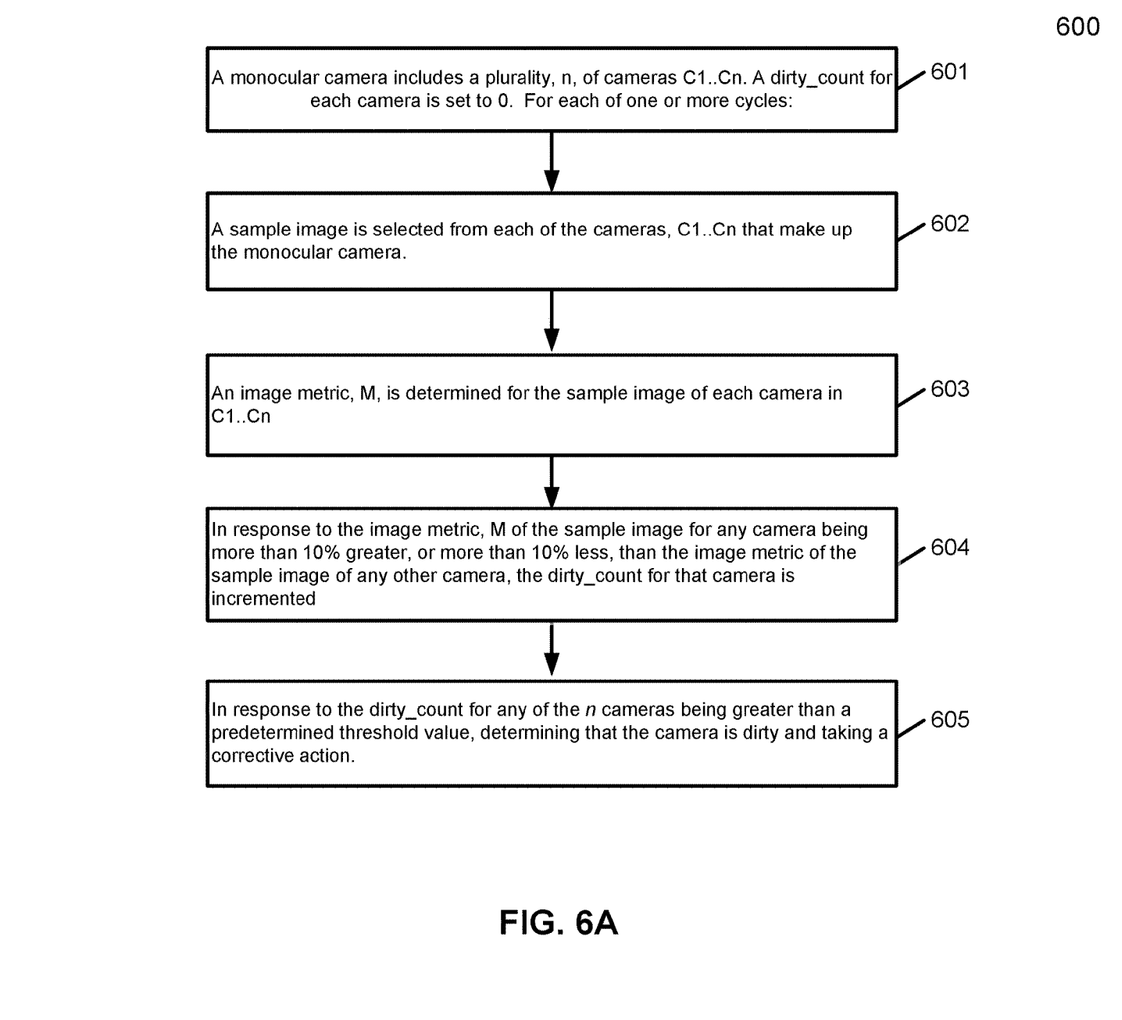
FIGS. 6A and 6B illustrate exemplary methods for determining whether one or more cameras having different focal lengths, in a multi-camera monocular sensor system, need cleaning, according to one embodiment.
Figure 6B:
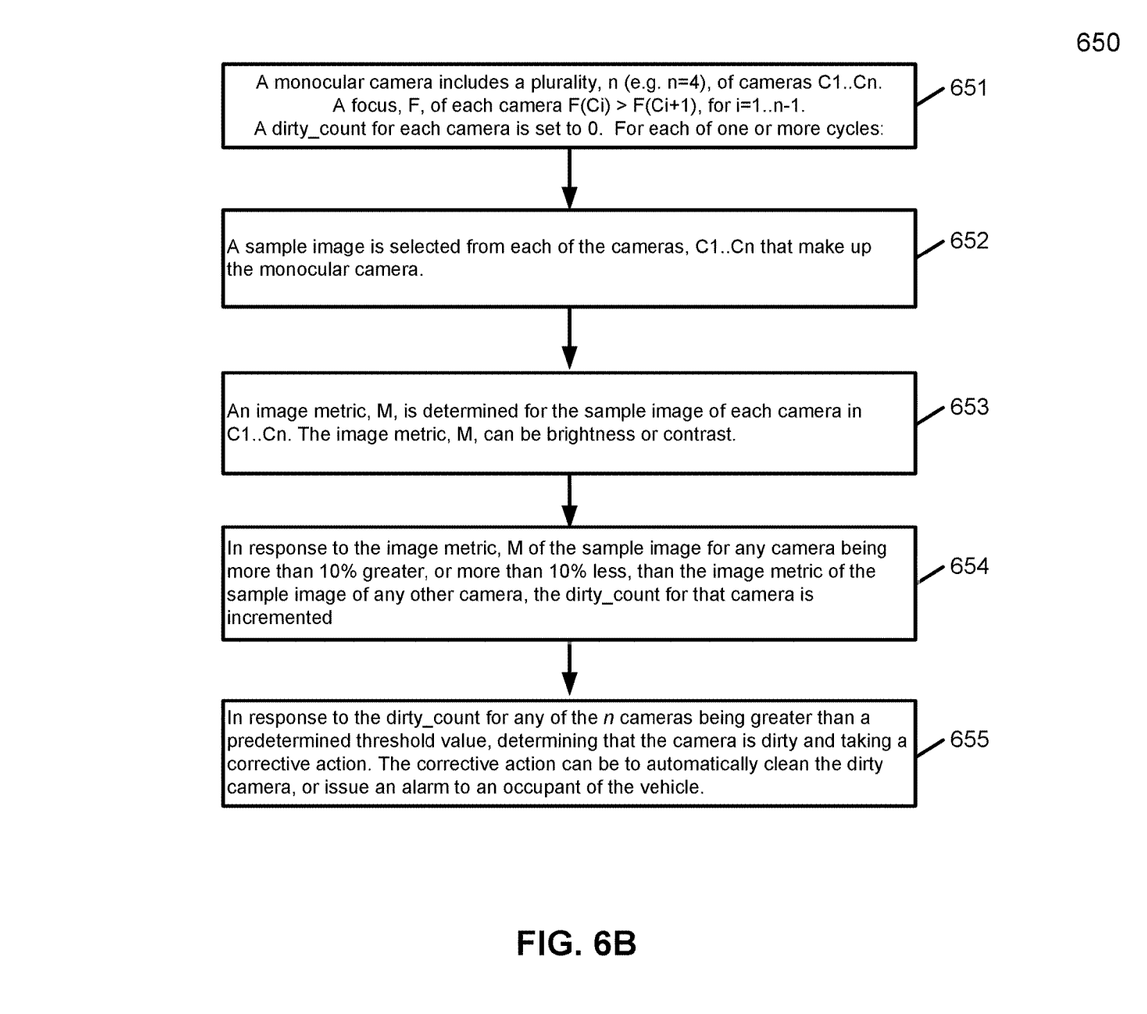

FIGS. 6A and 6B illustrate exemplary methods 600 and 650, respectively, for determining whether one or more cameras that make up a monocular sensor system are dirty.

With reference to FIG. 6A, in operation 601, a monocular camera comprises a plurality of n cameras, $C_1 \ldots C_n$. A dirty_count variable for each camera is set to 0. For each of one or more cycles performing operations for determining whether one or more of the cameras is dirty (operations 602-604). In an embodiment, a cycle occurs at 100 ms (10 Hz).

In operation 602, for each cycle, a sample image is selected from each of the cameras $C_1 \ldots C_n$ that make up the monocular camera. In an embodiment, the selected image for each camera is the most recent image taken during the cycle. The selected sample images need not have an exact same time stamp. The selected images comprise a sample image set, $I_1 \ldots I_n$, corresponding to the cameras $C_1 \ldots C_n$ from which the sample images were selected.

In operation 603, an image metric, M, is determined each image in the sample image set $I_1 \ldots I_n$ for cameras $C_1 \ldots C_n$. The image metric for each image in the sample image set comprises a sample image metric set, $M_1 \ldots M_n$.

In operation 604, in response to an image metric $M_i$ of the sample image $I_i$ for a camera $C_i$ for any i in 1 . . . n being more than 10% greater, or more than 10% less, then the image metric of the sample image for any other camera in the monocular camera, incrementing the dirty count for the camera $C_i$. Operation 604 loops back to operation 602 for as many cycles as may be included in the process. In an embodiment, the number of cycles per method iteration is 1 cycle, or 5 cycles. At the end of the number of cycles, method 600 continues at operation 605.

In operation 605, in response to the dirty_count for any of the n cameras being greater than a predetermined threshold value, determining that the camera is dirty and taking a corrective action. In an embodiment, the predetermined threshold is the same as the number of cycles, such that any camera that is marked dirty in all cycles is deemed to be dirty.

With reference to FIG. 6B, in operation 651, a monocular camera comprises a plurality of n (e.g. 4) cameras, $C_1 \ldots C_n$. A focal length, F, of each camera $F(C_i)>F(C_{i+1})$, for i=1 . . . n–1. A dirty_count variable for each camera is set to 0. For each of one or more cycles performing operations for determining whether one or more of the cameras is dirty (operations 652-654). In an embodiment, a cycle occurs at 100 ms (10 Hz).

In operation 652, a sample image is selected from each of the cameras $C_1 \ldots C_n$ that make up the monocular camera. In an embodiment, the selected image for each camera is the most recent image taken during the cycle. The selected sample images need not have an exact same time stamp. The selected images comprise a sample image set, $I_1 \ldots I_n$, corresponding to the cameras $C_1 \ldots C_n$ from which the sample images were selected.

In operation 653, an image metric, M, is determined each image in the sample image set $I_1 \ldots I_n$ for cameras $C_1 \ldots C_n$. The image metric for each image in the sample image set comprises a sample image metric set, $M_1 \ldots M_n$. The image metric can be brightness or contrast of the image.

In operation 654, in response to an image metric $M_i$ of the sample image $I_i$ for a camera $C_i$ for any i in 1 . . . n being more than 10% greater, or more than 10% less, then the image metric of the sample image for any other camera in the monocular camera, incrementing the dirty count for the camera $C_i$. Operation 654 loops back to operation 652 for as many cycles as may be included in the process. In an embodiment, the number of cycles per method iteration is 1 cycle, or 5 cycles. At the end of the number of cycles, method 600 continues at operation 605.

In operation 655, in response to the dirty_count for any of the n cameras being greater than a predetermined threshold value, determining that the camera is dirty and taking a corrective action. In an embodiment, the predetermined threshold is the same as the number of cycles, such that any camera that is marked dirty in all cycles is deemed to be dirty. The corrective action can include issuing an alarm to an occupant of the ADV or initiating a camera lens cleaning procedure. Method 600 ends.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of detecting a dirty camera in a plurality of n cameras, $C_1 \ldots C_n$, the method comprising:

for each of one or more cycles:
selecting a sample image from each of the cameras, $C_1 \ldots C_n$;
determining an image metric, $M_i$ for the sample image of each camera $C_i \epsilon C_1 \ldots C_{n_2}$ wherein the image metric corresponds to one or more properties of the sample image;
in response to a difference between the image metric $M_i$ of the sample image for any camera $C_i$ and the sample image of any other camera in $C_1 \ldots C_n$ is greater than a predetermined difference threshold, incrementing a dirty counter for camera $C_i$; and
in response to the dirty counter for any of the n cameras being greater than a predetermined threshold value, determining that the camera is dirty and taking a corrective action.

2. The method of claim 1, wherein the image metric is brightness.

3. The method of claim 1, wherein the image metric is contrast.

4. The method of claim 1, wherein the corrective action is to trigger a cleaning operation for any camera that is determined to be dirty.

5. The method of claim 1, wherein a frequency of the one or more cycles is 10 Hz.

6. The method of claim 1, wherein the number of cameras, n, is at least 4.

7. The method of claim 1, wherein for each camera, $C_i \epsilon C_1 \ldots C_{n-1}$, a focal length, $F(C_i) > F(C_{i+1})$, for i=1 ... n-1.

8. The method of claim 1, wherein the predetermined difference threshold is 10%.

9. A non-transitory machine-readable medium having instructions stored therein, which when executed by a processor, cause the processor to perform operations of detecting a dirty camera in a plurality of n cameras, $C_1 \ldots C_n$, the operations comprising:

for each of one or more cycles:
selecting a sample image from each of the cameras, $C_1 \ldots C_n$;
determining an image metric, $M_i$ for the sample image of each camera $C_i \epsilon C_1 \ldots C_{n_2}$ wherein the image metric corresponds to one or more properties of the sample image;
in response to a difference between the image metric $M_i$ of the sample image for any camera $C_i$ and the sample image of any other camera in $C_1 \ldots C_n$ is greater than a predetermined difference threshold, incrementing a dirty counter for camera $C_i$; and in response to the dirty counter for any of the n cameras being greater than a predetermined threshold value, determining that the camera is dirty and taking a corrective action.

10. The machine-readable medium of claim 9, wherein the image metric is brightness.

11. The machine-readable medium of claim 9, wherein the image metric is contrast.

12. The machine-readable medium of claim 9, wherein the corrective action is to trigger a cleaning operation for any camera that is determined to be dirty.

13. The machine-readable medium of claim 9, wherein a frequency of the one or more cycles is 10 Hz.

14. The machine-readable medium of claim 9, wherein the number of cameras, n, is at least 4.

15. The machine-readable medium of claim 9, wherein for each camera, $C_i \epsilon C_1 \ldots C_{n-1}$, a focal length, $F(C_i) > F(C_{i+1})$, for $i = 1 \ldots n-1$.

16. The machine-readable medium of claim 9, wherein the predetermined difference threshold is 10%.

17. A data processing system, comprising:
   a processor; and
   a memory coupled to the processor to store instructions, which when executed by the processor, cause the processor to perform operations of detecting a dirty camera in a plurality of n cameras, $C_1 \ldots C_n$, the operations including:
   for each of one or more cycles:
   selecting a sample image from each of the cameras, $C_1 \ldots C_n$;
   determining an image metric, $M_i$ for the sample image of each camera $C_i \epsilon C_1 \ldots C_{n_2}$ wherein the image metric corresponds to one or more properties of the sample image;
   in response to a difference between the image metric $M_i$ of the sample image for any camera $C_i$ and the sample image of any other camera in $C_1 \ldots C_n$ is greater than a predetermined difference threshold, incrementing a dirty counter for camera $C_i$; and
   in response to the dirty counter for any of the n cameras being greater than a predetermined threshold value, determining that the camera is dirty and taking a corrective action.

18. The system of claim 17, wherein the image metric is brightness.

19. The system of claim 17, wherein the image metric is contrast.

20. The system of claim 17, wherein the corrective action is to trigger a cleaning operation for any camera that is determined to be dirty.

* * * * *